United States Patent Office 3,427,163

Patented Feb. 11, 1969

3,427,163

DIAZOTYPE MATERIALS AND METHODS FOR PRODUCING DIAZOTYPE IMAGES

Bernard I. Halperin, Glen Aubrey, N.Y., assignor to International Business Machines Corporation, Armonk, N.Y., a corporation of New York No Drawing. Filed Dec. 28, 1965, Ser. No. 517,101

U.S. Cl. 96—49 7 Claims

Int. Cl. G03c *1/58, 5/34*

ABSTRACT OF THE DISCLOSURE

A method for producing high opacity diazotype images whereby a material containing a light-sensitive diazonium compound is selectively exposed to light so as to decompose said compound in the portion of said material where the light impinges, and whereby substantially anhydrous ammonia is applied at a pressure of about 35 p.s.i.g. to 985 p.s.i.g. so as to cause coupling with said undecomposed diazonium compound with a coupler having the general formula

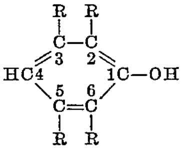

wherein, in a specific compound, R is other than hydrogen only at the 2,3-, 2,5- or 2,6-positions and R is a radical selected from the group consisting of hydrogen, halogen, aryl, alkyl, alkene and aralkyl radicals, thereby producing a high opacity image.

This invention relates to diazotype materials and to methods for producing diazotype images. In particular, the invention is concerned with diazo materials capable of yielding high ultraviolet opacity images upon development by the procedure described in United States patent application Ser. No. 369,861, filed May 25, 1964, by Boone et al., for Diazo Development Process. This patent application is directed to the development of diazo images by the application of high pressure ammonia, especially high pressure anhydrous ammonia.

An object of the present invention is to provide diazotype compositions, papers, films and the like which yield high opacity images upon development by high pressure ammonia.

A further object of the invention is to provide diazo materials which exhibit good stability and shelf life, but which are capable of very rapid development by high pressure ammonia.

In general, the invention comprises diazo materials incorporating a 2,3-, 2,5- or 2,6-disubstituted phenol coupler or mixture thereof. The invention further comprises the production of high opacity images by high pressure ammonia development of diazo materials incorporating a 2,3-, 2,5- or 2,6-disubstituted phenol coupler or mixture thereof.

While the invention is generally applicable to one or two component systems, it is particularly valuable in two component systems. Such systems generally comprise a substrate provided with a coating containing, as the essential ingredients, a light-sensitive diazonium compound and a coupler, in this instance a 2,3-, 2,5- or 2,6-disubstituted phenol coupler or mixture thereof. The coating may also contain an amount of an acid to stabilize the composition against premature coupling. Other coupling compounds may also be added to give a dye image of the desired color upon development. The film or paper element is selectively exposed to light and is then developed by being contacted with high pressure ammonia. The developing agent is preferably anhydrous ammonia.

The couplers incorporated in the diazo materials of this invention have the following general formula:

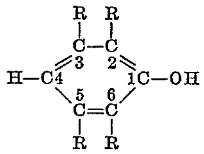

where, in a specific compound, R is other than hydrogen only at the 2,3-, 2,5- and 2,6-positions and R may be a radical selected from the group consisting of aryl, alkyl, alkene or aralkyl radicals. The radicals themselves may be unsubstituted or substituted by a carboxy, hydroxy, carbonyl or amino group and derivatives of any of these groups.

Specific compounds of the foregoing general formula, illustrative of those useful in this invention, include, for example, those in Table I.

TABLE I

A. 2,3-disubstituted phenol couplers: 2,3-dimethyl phenol

B. 2,5-disubstituted phenol couplers:
- 2,5-dimethyl phenol
- 2,5-ditertiary butyl phenol
- 2-tertiary butyl-5-methyl phenol
- 2,5-dichlorophenol
- 2-methyl-5-ethyl phenol C. 2,6-disubstituted phenol couplers:
- 2-allyl-6-methyl phenol
- 2,6-dimethyl phenol
- 2,6-diisopropyl phenol
- 2,6-ditertiary butyl phenol
- 2-tertiary butyl-6-methyl phenol
- 2-chloro-6-phenyl phenol
- 2-chloro-6-methyl phenol In a preferred embodiment of the invention, an organic solution is prepared containing an appropriate light-sensitive diazonium salt and a 2,3-, 2,5- and 2,6-disubstituted phenols of the type described. A coating of the solution is deposited onto a suitable substrate and is dried. The substrate may comprise a transparent film support of cellulose acetate, a paper web or any other suitable support material.

Any of the conventional, well known, light-sensitive diazonium compounds may be employed in preparing the diazo materials of the invention.

The resulting diazo material is then selectively exposed to light to decompose the light-sensitive diazonium compound in those areas where no image is desired.

The exposed diazo element is then developed by being subjected to high pressure ammonia, preferably anhydrous ammonia. Application of the ammonia brings about very rapid coupling of the undecomposed portion of the diazonium compound and the coupler compound. The anhydrous ammonia is applied at a pressure significantly in excess of atmospheric pressure. For example, a pressure in the range of from about 35 to 985 p.s.i.g. absolute is satisfactory. With diazo materials of the type described, development is substantially completed in about 1 second or less upon exposure to high pressure ammonia preferably anhydrous ammonia.

The following detailed examples of preferred embodiments of the invention will assist towards a fuller understanding of the invention.

EXAMPLE 1

As a specific example of the diazo materials and image forming process of the invention, diazo elements are produced and images formed in the following manner.

A solvent solution is prepared by mixing 30 parts by volume of methyl ethyl ketone with 40 parts by volume of methyl Cellosolve. The following ingredients are then dissolved in the solvent solution in the indicated percentages by weight:

| | Percent |
|---|---|
| Citric acid | 2 |
| Sulfosalicylic acid | 1 |
| p-Dimethylaminobenzene fluoborate | 1.5 |
| 2,5-dimethyl phenol | 2.0 |

A thin coating of the resulting solution is deposited onto a transparent cellulose acetate substrate and the coating is allowed to dry. The element is then exposed to light through a negative for from about 3 to 5 seconds and is developed by contact with anhydrous ammonia at a pressure of 80 p.s.i.g. for 1.0 second. This produces a fully developed, high opacity image.

EXAMPLE 2

The invention may also be practiced using diazo formulations comprising a resinous carrier or vehicle. Materials of this type are prepared and images are produced from such materials in the following manner:

A solvent solution is prepared by mixing 33 parts by volume of methyl ethyl ketone with 44 parts by volume of methyl Cellosolve. The following ingredients are then dissolved in the solvent solution in the indicated percentages by weight:

| | Percent |
|---|---|
| Bakelite AYAT | 1.12 |
| Rohm & Haas B–82 Acryloid | 0.75 |
| Sulfosalicylic acid | 1.0 |
| Citric acid | 2.0 |
| p-Dimethylaminobenzene fluoborate | 1.5 |
| 2,5-dimethyl phenol | 2.0 |

A thin coating of the resulting solution is deposited onto a transparent cellulose acetate substrate and is dried, exposed and developed as in Example 1. A fully developed, high opacity image is produced.

Film samples prepared from a standard diazotype formulation in the manner described above and incorporating the couplers in accordance with the present invention. The films then subjected to development by aqueous ammonia in a conventional "Ozamatic" developer and by anhydrous ammonia under a pressure of 80 p.s.i.g. for 1 second. The results are shown in the data in Table II.

TABLE II

| Coupler | Anhydrous ammonia (1 sec., 80 p.s.i.g.) | | Aqueous ammonia (Ozamatic) | |
|---|---|---|---|---|
| | Density D7–51 | No. of passes | Total dwell time, (sec.) | Density D7–51 |
| 2,3-dimethyl phenol | 0.35 | 10 | 30 | 0.36 |
| 2-tertiary butyl-5-methyl phenol | 0.46 | 15 | 52.5 | 0.43 |
| 2-methyl-5-ethyl phenol | 0.45 | 30 | 90 | 0.36 |

In Table II, D7–51 refers to the density of the image produced as measured by a standard densitometer provided with a 7–51 wavelength filter. As shown by the data, diazotype formulations of the present invention yield images of satisfactory opacity only after repeated passes through the "Ozamatic" but yield excellent images almost instantaneously under high pressure, anhydrous ammonia development.

Although this invention has been disclosed principally in terms of forming images in two component systems, namely those in which the diazo element contains both a diazonium salt and a coupler, it should be clearly understood that this invention is intended to have general applicability to one component systems as well. In the latter instance, the coupler compound is contacted with the undecomposed diazonium compound after exposure.

It will be apparent to those skilled in the art that modifications may be made in the composition and method illustratively described herein without departing from the spirit or scope of the invention as expressed in the following claims.

What I claim is:

1. A method for producing high opacity diazotype images comprising selectively exposing to light a layer of material containing light-sensitive diazonium compound to decompose said compound in the portion of said layer where the light impinges and where no azo dye formation is desired, and applying substantially anhydrous ammonia, at a pressure of about 35 p.s.i.g. to 985 p.s.i.g. to said undecomposed diazonium compound, so as to couple said diazonium compound with a coupler compound having a formula

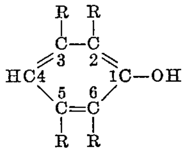

wherein, in a specific compound, R is other than hydrogen only at a 2,3-, 2,5- or 2,6-positions and R is a radical selected from the group consisting of hydrogen, halogen, aryl, alkyl, alkene and aralkyl radicals, thereby producing a high opacity image.

2. The method of claim 1 wherein said undecomposed diazonium compound is contacted with said coupler by mixing said coupler compound with said light-sensitive diazonium compound in said layer prior to exposure.

3. The method of claim 1 wherein said coupler is contacted with said undecomposed diazonium compound by application to said layer after exposure.

4. The method of claim 1 wherein R is an aryl radical.

5. The method of claim 1 wherein R is an alkyl radical.

6. The method of claim 1 wherein R is an alkene radical.

7. The method of claim 1 wherein R is an aralkyl radical.

References Cited

UNITED STATES PATENTS

| | | | |
|---|---|---|---|
| 2,245,628 | 6/1941 | Von Poser et al. | 96—91 XR |
| 2,970,909 | 2/1961 | Slimowicz | 96—75 XR |
| 3,307,949 | 3/1967 | Schlesinger et al. | 96—91 XR |
| 3,364,833 | 1/1968 | Mulvany | 96—49 XR |

FOREIGN PATENTS

| | | |
|---|---|---|
| 867,432 | 5/1961 | Great Britain. |
| 937,510 | 9/1963 | Great Britain. |
| 941,838 | 11/1963 | Great Britain. |
| 980,376 | 1/1965 | Great Britain. |

J. TRAVIS BROWN, *Primary Examiner.*

C. BOWERS, *Assistant Examiner.*

U.S. Cl. X.R.

96—91